United States Patent
Abdelhamid et al.

(10) Patent No.: US 11,097,659 B1
(45) Date of Patent: Aug. 24, 2021

(54) REAR OCCUPANT ALERT SYSTEM

(71) Applicant: Ford Global Technologies, LLC, Dearborn, MI (US)

(72) Inventors: Mahmoud Abdelhamid, Canton, MI (US); Meisam Yousif, West Bloomfield, MI (US); Sonya (S. D.) Bentley, Walled Lake, MI (US); Nathan Rinderer, Ferndale, MI (US); Saeed Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/840,238

(22) Filed: Apr. 3, 2020

(51) Int. Cl.
*B60Q 5/00* (2006.01)
*B60N 2/00* (2006.01)
*B60Q 1/50* (2006.01)

(52) U.S. Cl.
CPC ............. *B60Q 5/005* (2013.01); *B60N 2/002* (2013.01); *B60Q 1/503* (2013.01)

(58) Field of Classification Search
CPC ........ G08B 21/24; G08B 21/22; G08B 25/10; B60N 2/002; G06K 9/00838
USPC ................................ 340/457, 425.5; 180/273
See application file for complete search history.

(56) References Cited

U.S. PATENT DOCUMENTS

| | | | | |
|---|---|---|---|---|
| 4,674,456 A * | 6/1987 | Merritt | ............... | F01M 11/0458 123/196 R |
| 6,218,961 B1 * | 4/2001 | Gross | ............... | B60T 7/22 246/122 R |
| 7,012,533 B2 * | 3/2006 | Younse | ............... | B60N 2/002 180/273 |
| 7,079,016 B2 * | 7/2006 | Ho | ............... | G08B 21/22 180/273 |
| 7,218,211 B2 * | 5/2007 | Ho | ............... | B60N 2/002 180/273 |
| 8,493,201 B2 | 7/2013 | Orbach | | |
| 9,302,618 B2 * | 4/2016 | Shaw | ............... | B60N 2/26 |
| 9,630,496 B2 * | 4/2017 | Cuddihy | ............... | B60K 28/04 |
| 9,663,032 B1 * | 5/2017 | Appukutty | ............... | B60N 2/002 |
| 9,965,940 B1 | 5/2018 | Voss et al. | | |
| 10,220,806 B2 * | 3/2019 | Elangovan | ............... | B60R 25/1003 |
| 10,343,553 B2 | 7/2019 | Dicanosa et al. | | |
| 2004/0113797 A1 * | 6/2004 | Osborne | ............... | G08B 21/22 340/573.4 |
| 2005/0068162 A1 * | 3/2005 | Santa Cruz | ............... | B60N 2/002 340/457 |

(Continued)

*Primary Examiner* — Eric Blount
(74) *Attorney, Agent, or Firm* — Polsinelli PC; Frank MacKenzie

(57) ABSTRACT

The vehicle rear occupant alert system provides alerts corresponding to occupancy of rear seats. The system comprises a door position sensor, an ignition sensor, and an alert system. Further, the alert system comprises a processor and a memory. The door position sensor determines a rear door status between an ajar position and a closed position. The ignition sensor determines an ignition state between an ON state and an OFF state. The alert system is coupled with the sensors. The processor adjusts status of the alert system as armed if the rear door transitions from ajar to closed position and the ignition transitions from OFF to ON state. The alert system notifies and alerts a driver to check the rear seat when the ignition transitions to OFF state. The processor rearms the alert system after the ignition transitions from OFF to ON state within a predefined time.

20 Claims, 8 Drawing Sheets

(56) References Cited

U.S. PATENT DOCUMENTS

| | | | |
|---|---|---|---|
| 2007/0088488 A1* | 4/2007 | Reeves | G07C 5/0891 |
| | | | 701/117 |
| 2014/0043152 A1* | 2/2014 | Lippman | B60W 30/14 |
| | | | 340/438 |
| 2015/0165932 A1* | 6/2015 | Maley | B60N 2/002 |
| | | | 340/457 |
| 2016/0042616 A1* | 2/2016 | Dorsey | G08B 21/24 |
| | | | 340/457 |
| 2017/0116839 A1* | 4/2017 | Friedman | B60N 2/26 |
| 2017/0232887 A1* | 8/2017 | Clontz | B60N 2/002 |
| | | | 340/457 |
| 2017/0323549 A1* | 11/2017 | Copulos | G08B 21/24 |
| 2018/0111597 A1* | 4/2018 | May | B60K 28/12 |
| 2018/0174419 A1* | 6/2018 | Biondo | G08B 21/0205 |
| 2018/0253959 A1 | 9/2018 | Andrade et al. | |
| 2019/0263320 A1 | 8/2019 | Onodera et al. | |

\* cited by examiner

REAR OCCUPANT ALERT SYSTEM

TECHNICAL FIELD

The present disclosure generally relates to a vehicle rear occupant alert system.

BACKGROUND

There are several vehicle-related non-traffic incidents that can pose health and safety issues for children. One such incident is leaving a child unattended in a vehicle, particularly during hot or cold days. Even attentive adults may leave a child seated in the rear seat of a vehicle while performing errands or making other stops. The adult may leave the child in the vehicle and may fail to return to the vehicle as quickly as anticipated due to delays and absent-mindedness. On other occasions, such as when the adult is in a hurry, the guardian may simply forget that the child is in the vehicle.

SUMMARY

The present disclosure relates to a vehicle rear occupant alert system. The present disclosure addresses a need to capture multiple scenarios to arm the vehicle rear occupant alert system. The present disclosure also provides an automatic notification to a new owner of a vehicle aware of features related to a rear occupant alert and provides an option to enable or disable the vehicle rear occupant alert system. The present disclosure discloses a method for providing alerts corresponding to occupancy of one or more rear seats.

In one aspect of the present disclosure, the vehicle rear occupant alert system comprises a door position sensor, an ignition sensor, and an alert system. The door position sensor is operably coupled with at least one rear door of a vehicle. The door position sensor is operable to determine a rear door status between an -ajar position and a closed position. The ignition sensor is operably coupled with the vehicle to determine an ignition state between an ON state and an OFF state, wherein the ignition state in the ON state includes a run position or a start position and the ignition state is the OFF state includes an OFF state or an Accessory state. The alert system is operably coupled with the door position sensor and the ignition sensor.

The alert system can comprise one or more processors and a non-transitory computer-readable medium comprising instructions executable by the processor. The execution of the instructions can cause the processor to receive, from the door position sensor, a signal that the rear door status of the at least one rear door changed from the closed position to the ajar position. In at least one example, the ajar position may include a position, where the rear door is completely open or any intermediate position(s) when the rear door is not completely open but is not in the closed position. Further, the execution of the instructions can cause the processor to receive, from the ignition sensor, a signal indicating the ignition state is changed from the OFF state to the ON state. The processor receives the signal corresponding ignition state within a predefined time of the at least one rear door status changing from the closed position to the ajar position to the closed position and to adjust the alert system status to armed. The predefined time is reset each time a same rear door or other rear door changes status from the closed position to the ajar position. The predefined time begins when the rear door status changes from the closed position to the ajar position and then to the closed position.

In another aspect of the present disclosure, the execution of the instructions can cause the processor to receive, from the ignition sensor, a signal indicating the ignition state that has changed from an OFF state to an ON state. Further, the execution of instructions can cause the processor to receive, from the door position sensor, a signal corresponding at least one rear door status changing from the closed position to the ajar position. Upon receiving the signal from the ignition sensor and followed by the signal from the door position sensor, the alert system status is changed to armed immediately, that is anytime with no consideration of predefined time. The processor receives a signal corresponding at least one rear door status changing from the closed position to the ajar position.

Further, the execution of the instructions can cause the processor to receive, from the ignition sensor, a signal indicating the ignition state changed from the ON state to the OFF state. Upon receiving the signal indicating the ignition state, the processor generates a rear occupant alert, thereby adjusting the alert system status to disarmed. The alert system status is adjusted to armed if the ignition state is changed from the OFF state to the ON state within a predetermined period of time and the rear door status remains in the closed position.

The vehicle rear occupant alert system is operably transitionable to a de-activated status and is automatically re-activated after a prefixed time. In at least one instance, the prefixed time is six months. The vehicle rear occupant alert system provides a pop-up message after the prefixed time to inform the driver that vehicle rear occupant alert system is OFF and provides the driver an option to either turn it the vehicle rear occupant alert system ON or OFF. In another instance, the activation of the vehicle rear occupant alert system is dependent on a prefixed driven mileage. In an aspect, the prefixed driven mileage is 15,000 miles. The vehicle rear occupant alert system provides a pop-up message after a certain driven mileage to inform the driver the vehicle rear occupant alert system is OFF and provides the driver an option to either turn it the vehicle rear occupant alert system ON or OFF.

The vehicle rear occupant alert system further comprises a seat sensor coupled with a rear seat. The seat sensor is operable to determine a presence of a rear seat occupant by a predetermined mass engaged with the rear seat, and the non-transitory computer-readable medium comprising executable instructions. The executable instructions which when executed by a processor, further causes the processor to receive, from the seat sensor, a signal indicating the presence of the rear seat occupant. The alert is an audio alert and the vehicle rear occupant alert system further includes a display, and the processor is operable to display the alert on the display. The alert is an auditory alert and a visual alert.

In another aspect of the present disclosure, a non-transitory computer-readable medium comprises executable instructions. The executable instructions which when executed by a processor, cause the processor to receive, from a door position sensor, a signal that a rear door status of at least one rear door changed from an ajar position to a closed position. Further, the executable instructions, which when executed by a processor, cause the processor to receive a signal indicating an ignition state changed from an OFF state to an ON state. The processor receives the signal indicating the ignition state within the predefined time of the at least one rear door status changing to the closed position. Upon receiving the signals corresponding to ignition state within the predefined time, the processor adjusts an alert system status to armed.

Further, the executable instructions which when executed by a processor, cause the processor to receive, from the ignition sensor, a signal indicating the ignition state changed from the ON state to the OFF state. The processor generates a rear occupant alert, thereby adjusting the alert system status to disarmed. The alert system status is adjusted to armed if the ignition state is changed from the OFF state to the ON state within a predetermined period of time and the rear door status remains in the closed position.

In another aspect of the present disclosure, a method of detecting a rear seat occupant includes a step of receiving a signal that a rear door status of at least one rear door changed from an ajar position to a closed position. A door position sensor provides the signal corresponding to the rear door status. Further a step of receiving a signal indicating an ignition state changed from an OFF state to an ON state within the predefined time of the at least one rear door status changing to the closed position. An ignition sensor provides the signal corresponding to the ignition state. Further, the method includes a step of adjusting status of an alert system to armed based on the ignition state and the rear door status.

The method further includes a step of receiving, from the ignition sensor, a signal indicating the ignition state changed from the ON state to the OFF state. Based on the ignition state, the method includes a step of generating a rear occupant alert, thereby adjusting the alert system status to disarmed. However, the alert system status is adjusted to armed if the ignition state is changed from the OFF state to the ON state within the predefined period of time and the rear door status remains in the closed position.

In another aspect of the present disclosure, a non-transitory computer-readable medium comprises executable instructions. The executable instructions, which when executed by a processor, cause the processor to receive from the body control module a signal indicates the operation vehicle mode, such as normal, transport, or factory. If the vehicle mode is factory or transport, the alert system is disarmed, and no alerts are generated. Once, the received signal indicates the vehicle is in normal mode, then the normal logic is performed to arm the system and generate the alerts.

In another aspect of the present disclosure, a non-transitory computer-readable medium comprises executable instructions. The executable instructions, which when executed by a processor, cause the processor to receive a Data IDentifier (DID) binary values signal for End Of Line (EOL) configuration. If the received signal includes the DID value as active, then the processor of the vehicle rear occupant alert system performs normal operation and generates alerts based on necessary conditions. However, if the received signal includes the DID value as inactive, then the processor of the vehicle rear occupant alert system does not perform a normal operation and does not generate alerts irrespective of the necessary conditions being met, that is, the system is fully disarmed, and no alerts are generated.

BRIEF DESCRIPTION OF THE DRAWINGS

The above-mentioned implementations are further described herein with reference to the accompanying figures. It should be noted that the description and figures relate to exemplary implementations and should not be construed as a limitation to the present disclosure. It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

DETAILED DESCRIPTION

Figure 1:
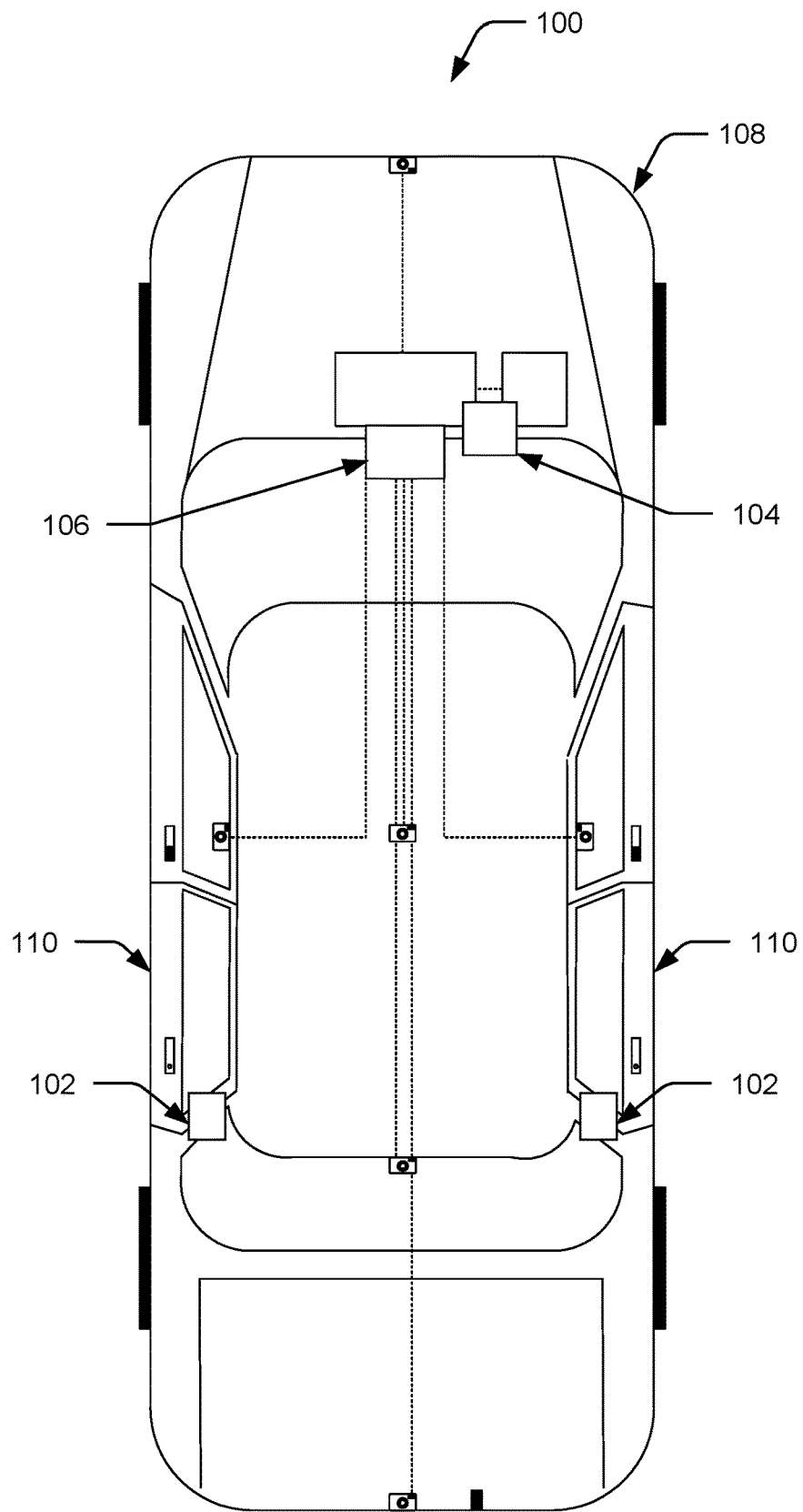
FIG. 1 illustrates a vehicle rear occupant alert system, according to an embodiment of the present disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with engine compartments have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one aspect" or "an aspect" means that a particular feature, structure or characteristic described in connection with an embodiment is included in at least one aspect. Thus, the appearances of the phrases "in one aspect" or "in an aspect" in various places throughout this specification are not necessarily all referring to the same embodiment. Furthermore, the particular features, structures, or characteristics may be combined in any suitable manner in one or more aspects.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The present disclosure relates to a vehicle rear occupant alert system (VROAS). The VROAS can include a door position sensor operably coupled with at least one rear door of a vehicle. The door position sensor can be operable to determine a rear door status between an ajar position and a closed position. The context of ajar position as used throughout this disclosure may include the rear door to be in a completely open position or any intermediate position when the rear door is not completely open and is not in the closed position. The VROAS can further include an ignition sensor operably coupled with the vehicle, wherein the ignition sensor is operable to determine an ignition state between an ON state and an OFF state. Further, the VROAS system can include an alert system operably coupled with the door position sensor and the ignition sensor.

In an aspect, the VROAS can be operably transitionable to a de-activated status and can be automatically re-activated after a prefixed time, such as 6 months. In another aspect, the VROAS can be operably transitionable to a de-activated status and can be automatically re-activated after a prefixed mileage, such as 15,000 miles. The VROAS provides a pop-up notification to inform the driver that the VROAS is OFF and provides an option to the driver to turn the VROAS back ON, that is, to reactivate the VROAS. The VROAS can further comprise a seat sensor coupled with a rear seat. The seat sensor can be operable to determine the presence of a rear seat occupant by a predetermined mass engaged with the rear seat.

FIG. 1 illustrates a Vehicle Rear Occupant Alert System (VROAS) 100, as per one aspect of the present disclosure, that can be installed on a vehicle 108. In the illustrated aspect, the vehicle 108 can be an autonomous or semi-autonomous four-wheeler car. In an aspect, the vehicle 108 includes one of an electric motor, hybrid engine, and internal combustion engine. The VROAS 100 includes a door position sensor 102, an ignition sensor 104, and an alert system 106. The door position sensor 102 is a sensing device for monitoring a door status of the vehicle 108, where the door status is either the ajar position or the closed position. The door position sensor 102 is operably coupled with at least one of the two rear doors 110 of the vehicle 108. The vehicle, in an aspect, includes at least one door position sensor 102 at each rear door 110 of the vehicle 108. The door position sensor 102 is positioned in a way such that there is no ambiguity for determining the rear door status.

The ignition sensor 104 is a sensing device for monitoring an ignition state of the vehicle 108, where the ignition state is either an ON state or an OFF state. The ignition state in the ON state includes a run position or a start position and the ignition state in the OFF position includes an OFF state or an accessory position. In the OFF state, the engine is OFF and the power to electrical accessories (not shown in the Figure) are OFF. The electrical accessories are, for example, vehicle stereo, headlights, air ventilator, etc. In the accessory position, the electrical accessories receive power thereby allowing usage of radio, windshield wipers, etc., while the engine is OFF. In the run position, the electrical accessories, instrument panel, and the engine receive power. The run position is chosen when an onboard diagnostic is to be performed. In the start position, the electrical accessories, the instrument panel, and the engine receive power and a starter is engaged to crank the engine. The ignition sensor 104 is operably coupled with an engine (not shown in the Figure) of the vehicle 108. The ignition sensor 104 and the door position sensor 102 are operably coupled with the alert system 106. The alert system 106 receives a signal from the door position sensor 102 that the rear door status of the at least one rear door 110 changed from the ajar position to the closed position. Further, the alert system 106 receives a signal from the ignition sensor 104 indicating that the ignition state has changed from the OFF state to the ON state. This change in status is within a predefined time of the rear door status of the at least one rear door 110 changing from the ajar position to the closed position. In a specific aspect, the predefined time is fifteen minutes.

If the alert system 106 receives a signal from the ignition sensor 104 indicating that the ignition state has changed from the OFF state to the ON state before receiving the signal from the door position sensor 102 that the rear door status of the at least one rear door 110 changed from the ajar position to the closed position, the alert system 106 is armed without consideration of the predefined time.

The alert system 106 includes two statuses, armed status and disarmed status. The armed status corresponds to the fulfillment of one or more conditions to provide an alert by the VROAS 100 to the driver to indicate occupancy in the rear seat of the vehicle 108. Alternatively, the disarmed status corresponds to either nonfulfillment of one or more conditions to provide an alert by the VROAS 100 to the driver of the vehicle 108 or completion providing the alert to the driver and an assumption that rear occupant has left the vehicle 108 with the rear seats empty. The alert system 106 primarily or by default is in a disarmed status.

The alert system 106 is configured to adjust its status to armed when the rear door status of the one or more rear doors 110 changes from the ajar position to the closed position, after the ignition state changes from the OFF state to the ON state within the predefined time. The predefined time is, for example, fifteen minutes.

Alternatively, the alert system 106 is configured to adjust its status to armed when the ignition state transitions from the OFF state to the ON state anytime (without a predefined time) of the rear door status changing from the open position to the closed position.

The alert system 106 with the armed status receives a signal from the ignition sensor 104 indicating that the ignition state changed from the ON state to the OFF state. The alert system 106 with the armed status generates a rear occupant alert for a driver of the vehicle 108 to check for one or more rear seat occupants in the vehicle 108. The alert system 106 generates the rear occupant alert within a time period, for example, five hundred milliseconds, after the ignition state changes from the ON state to the OFF state. The alert system 106 provides the rear occupant alert for a time duration of, for example, 10 seconds and terminates the rear occupant alert after the time duration.

In an aspect, the rear occupant alert is a visual alert and/or an audio alert or a combination thereof. The visual alerts are visual cues such as notifications to check the one or more rear seats, graphical representations indicating the driver to check the rear seat, and the like.

In another aspect, the alert system 106 may provide sound alerts to the driver to check the one or more rear seats. The sound alert is, for example, a verbal notification to check the one or more rear seats, a chime to alert the driver to check the one or more rear seat, etc. In at least one instance, the volume of the sound alert can increase throughout the duration of the alert. In other instances, the volume can fluctuate throughout the duration and/or for a portion of the duration of the alert. The alert system 106 is configured to receive inputs from the driver to manually terminate the rear occupant alert within the time duration. The alert system 106 automatically terminates the rear occupant alert after an expiry of the time duration.

The alert system 106 adjusts its status to disarmed after providing the rear occupant alert. The status of the alert system 106 is adjusted to armed if the ignition state changes from the OFF state to the ON state, that is a new ignition cycle, within a predetermined period of time. The predetermined period of time is a duration of time lapsed after the ignition state is changed from the ON state to the OFF state and back to the ON state, while the rear door status of the one or more rear doors 110 remains in the closed position. In a specific aspect, the predetermined period of time is fifteen minutes. Therefore, the alert system 106 arms itself after disarming, if the new ignition cycle, that is the change in the ignition state from the OFF state to the ON state, is detected within the predetermined period of time.

For example, at a gas station, the driver turns the ignition OFF and within fifteen minutes turns the ignition ON without opening the rear door 110. The alert system 106 provides the rear occupant alert after the ignition was turned OFF and disarms itself. However, once the ignition is turned ON, within fifteen minutes from the ignition OFF, the alert system 106 again arms itself, that is, re-arms itself. The VROAS 100 uses a timer (not shown in the Figure) for measuring time and determining if the predetermined period of time has elapsed.

The VROAS 100, in an aspect, includes a seat sensor (not shown in the Figure) coupled to a rear seat (not shown in the Figure) in the vehicle 108. In at least one instance, the seat sensor is configured to determine a presence of the rear seat occupant of a predetermined mass engaged with the rear seat. In other instances, the seat sensor can be a camera or other device operable to determine the presence of a rear seat occupant. The seat sensor can be operable to determine the presence of a rear seat occupant compared to non-occupants (e.g. cargo).

The alert system 106 is coupled to the seat sensor to receive a signal from the seat sensor indicating the presence of the rear seat occupant. The alert system 106, based on the signals from the door position sensor 102, the ignition sensor 104 and the seat sensor, adjusts the status of the alert system 106 as armed and generates the rear occupant alert.

The VROAS 100, in an aspect, includes the door position sensor 102 positioned on a trunk lid of the vehicle 108 (not shown in the Figure) and the status of the trunk lid is considered for arming the alert system 106 in a way similar to the rear door status of the one or more rear doors 110.

The VROAS 100 operates to provide the rear occupant alert to the driver when the VROAS 100 is activated. The VROAS 100 stops providing the rear occupant alert to the driver when the VROAS 100 is de-activated. The VROAS 100 can be manually de-activated.

Figure 2:
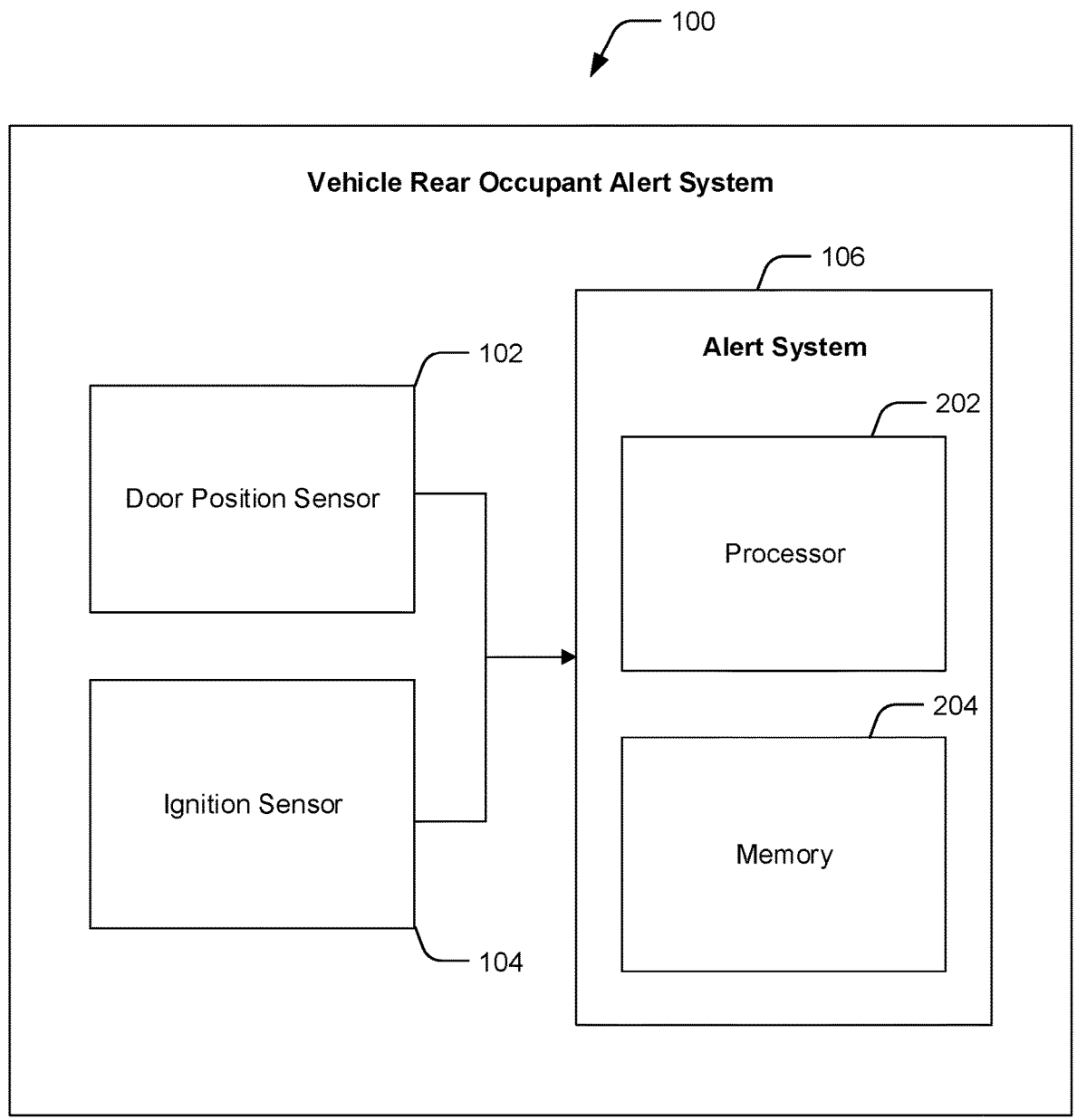
FIG. 2 is a block diagram of the vehicle rear occupant alert system for alerting a driver to check for a rear occupant (s), according to an embodiment of the present disclosure.

In an aspect, the VROAS 100 can be automatically or manually re-activated. In an aspect, the VROAS 100 is automatically re-activated after a prefixed time of being de-activated. In an aspect, the prefixed time is six months. The VROAS 100 may request the driver to re-activate the rear occupant alert to ensure that if there is a change in the ownership of the vehicle 108, the new owner is aware of the rear occupant alert. In another aspect, the VROAS 100, which had been de-activated, is re-activated after the vehicle 108 completes a predetermined number of miles of driving. In another aspect, the VROAS 100 is automatically re-activated after a prefixed mileage. In an example, the prefixed driven mileage is 15,000 miles FIG. 2 is a block diagram of the VROAS 100 for alerting the driver to check for the rear occupant(s), according to an embodiment of the present disclosure. The VROAS 100 includes the door position sensor 102, the ignition sensor 104, and the alert system 106. The VROAS 100 is operably transitionable to an activated status or a de-activated status.

The door position sensor 102, as disclosed in FIG. 1, is operably coupled with the one or more rear doors 110 of the vehicle 108 for monitoring the rear door status of the rear doors 110. The rear door status can either be the ajar position or the closed position. The ignition sensor 104, as disclosed in FIG. 1, is operably coupled to the engine of the vehicle 108 for monitoring the ignition state of the ignition of the vehicle 108. The ignition state can either be in the ON state or the OFF state. The door position sensor 102 and the ignition sensor 104 are operably coupled with the alert system 106.

The alert system 106 includes one or more processors 202 and a memory unit 204. The memory unit 204 is, for example, a non-transitory computer-readable medium comprising executable instructions. The one or more processor 202 executes one or more instructions to perform various tasks as detailed below.

The processor 202 receives a signal from the door position sensor 102 when the rear door status of the one or more rear doors 110 changes from the open position to the closed position. Further, the processor 202 receives a signal from the ignition sensor 104 indicating that the ignition state has changed from the OFF state to the ON state. The ignition state should change within the predefined time of the rear door status of at least one rear door 110 changing from the open position to the closed position. The predefined time is, for example, fifteen minutes.

The processor 202 then adjusts the alert system 106 status to armed. Further, the processor 202 receives a signal from the ignition sensor 104, where the signal indicates a change in the ignition state from the ON state to the OFF state. Thereafter, the processor 202 generates the rear occupant alert and adjusts the status of the alert system 106 to disarmed. The rear occupant alert is generated within a time period of the ignition state changing from the ON to the OFF state, for example, five hundred milliseconds.

In an aspect, the rear occupant alert is at least one of a visual alert or an audio alert. The visual alert and the audio alert may be provided sequentially or simultaneously. The audio alert is, for example, a chime. In an aspect, if at the time of the audio alert, there exists a media content, that is, mixable prompts scenario, then the alert system 106 attenuates audio of the media content to a lower volume to make the audio alert observable to the driver. In an aspect, if at the time of the visual alert, there exists a media content, that is, mixable prompts scenario, then the alert system 106 blurs or blocks the media content to display the visual alert that is observable to the driver.

However, if the ignition state changes from the OFF state to the ON state within the predetermined period of time and the rear door status of the one or more rear doors 110 remains in the closed position, then the processor 202 adjusts the status of the alert system 106 as armed. In an aspect, the VROAS 100 includes one or more timers (not shown in the Figure) for determining the predetermined period of time.

Figure 3:
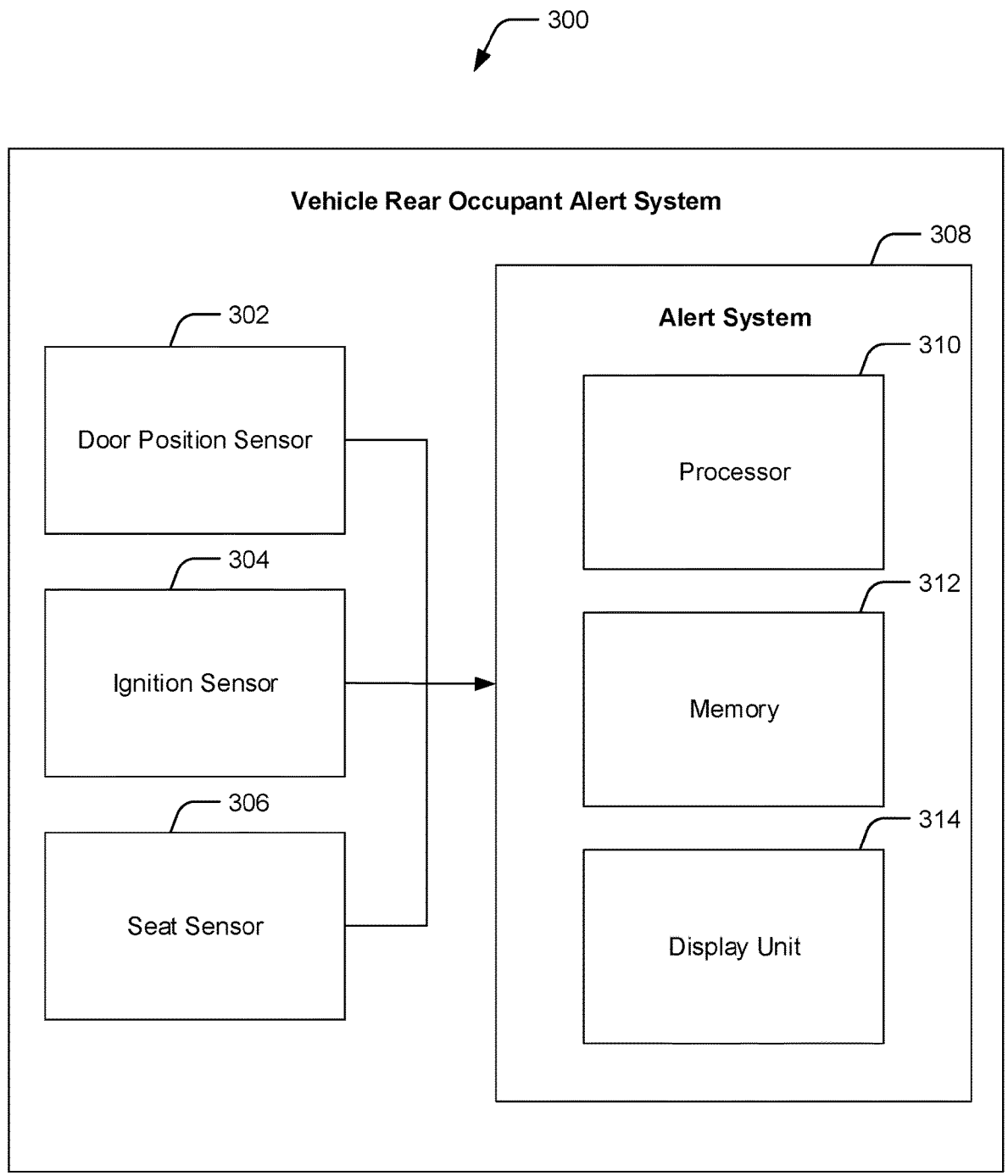
FIG. 3 is a block diagram of another aspect of the vehicle rear occupant alert system for alerting a driver to check for a rear occupant(s), according to an embodiment of the present disclosure.

FIG. 3 is a block diagram of another aspect of the VROAS 300 for alerting the driver to check for the rear seat occupants, according to an embodiment of the present disclosure. The VROAS 300 includes a door position sensor 302, an ignition sensor 304, a seat sensor 306 and an alert system 308.

The door position sensor 302 is a sensing device, coupled to the one or more rear doors (not shown in the Figure), for monitoring the rear door status. The rear door status can be either an ajar position or a closed position. The ignition sensor 304 is a sensing device, coupled to the engine of the vehicle, for monitoring the ignition state. The ignition state can be either in an ON state or in an OFF state.

The seat sensor 306 is coupled to one or more rear seats. The seat sensor 306 is configured to sense a presence of an occupant on a rear seat based on a predetermined mass engaged with the rear seat.

It may be contemplated that the door position sensor 302 and the ignition sensor 304 may operate in a similar manner that of the door position sensor 102 and the ignition sensor 104 as discussed in the detailed description of FIGS. 1-2.

The alert system 308 is operably coupled to the door position sensor 302, the ignition sensor 304, and the seat sensor 306. The alert system 308 further includes a processor 310, a memory 312, and a display unit 314.

The display unit 314, for example, is a screen that is an output device for display purposes only. The display unit 314, for example, can be a touch-enabled display unit that may be used as an input device and an output device. The display unit 314 is a human-machine interface. The display unit includes, but not limited to, a liquid crystal display, a plasma display, an Organic Light Emitting Diode (OLED) based display, etc. The memory 312 includes computer-readable instructions, which when executed by the processor 310, performs a method to alert the driver about the rear seat occupants, as detailed below.

The processor 310 of the alert system 308 receives a signal from the door position sensor 302 that the rear door status of the one or more rear doors changed from the ajar position to the closed position. Thereafter, the processor 310 receives a signal from the ignition sensor 304 indicating that the ignition state has changed from the OFF state to the ON state. The ignition state should change within the predefined time of the rear door status of the one or more rear doors changing from the open position to the closed position. The processor 310 also receives a signal from the seat sensor 306 indicating the presence of the rear seat occupant. The processor 310 upon receiving these signals from the door position sensor 302, the ignition sensor 304 and the seat sensor 306 adjusts the status of the alert system 308 as armed.

The processor 310 continues to hold the status of the alert system 308 as armed till the ignition state is in the ON state. Further, the processor 310 receives a signal from the ignition sensor 304 indicating that the ignition state has changed from the ON state to the OFF state. The processor 310 then generates the rear occupant alert and adjusts the status of the alert system 308 as disarmed. In an aspect, the processor 310 generates the rear occupant alert within five hundred milliseconds of the change in the ignition state from the ON state to the OFF state.

The rear occupant alert is at least one of a visual alert or an audio alert. The visual alert is displayed on the display unit 314.

The visual alert, for example, includes a notification with a text requesting the driver to check the rear seats for the rear seat occupants. The visual alert, for example, is a notification with one or more signs that provide a meaning to the driver to check the rear seat for occupants. In an aspect, the visual alerts are visual cues such as notifications mentioning to check the rear seat, graphical representations indicating the user to check the rear seat, and the like.

The visual alert is displayed on the display unit 314 for a given time duration, for example, at least 10 seconds. The driver also has an option to provide an input to close the visual alert before 10 seconds. In an aspect, the display unit 314 includes an in-built speaker for providing the audio alert and the visual alert simultaneously.

In an aspect, if a multimedia content, for example, a video, is being displayed on the display unit 314, then the alert system 308 pauses the multimedia content and overlays the visual alert on the display unit 314.

In another aspect, the alert system 308 is coupled to one or more optical sensors (not shown in the Figure) positioned within the vehicle to monitor the rear seat occupants of the one or more rear seats. The visual alert includes providing a video input from the optical sensors on the display unit 314 to show the driver a real-time video of the rear seat occupants. A textual notification can be provided along with the video input and combined with the audio alerts. In another aspect, the alert system 308 includes an audio unit (not shown in the Figure) for providing audio alerts. The audio alert is, for example, a chime, an audio output that requests the driver to look at the rear seats, etc.

In an aspect, if the VROAS 300 is de-activated, then the display unit 314 displays a notification to activate the VROAS 300 after completion of the prefixed time, such as six months, after the de-activation. The display unit 314 accepts an input from the driver to activate the VROAS 300 or to continue with the de-activation of the VROAS 300. The driver can close the visual alert by touching on a virtual stop button or a close button display on the display unit 314. In another aspect, the driver activates the VROAS 300 anytime based on necessity. In yet another aspect, the VROAS is coupled to a physical component (not shown in the Figure), such as a button to manually override the VROAS, where a press on the button disables, the VROAS 300.

Figure 4:
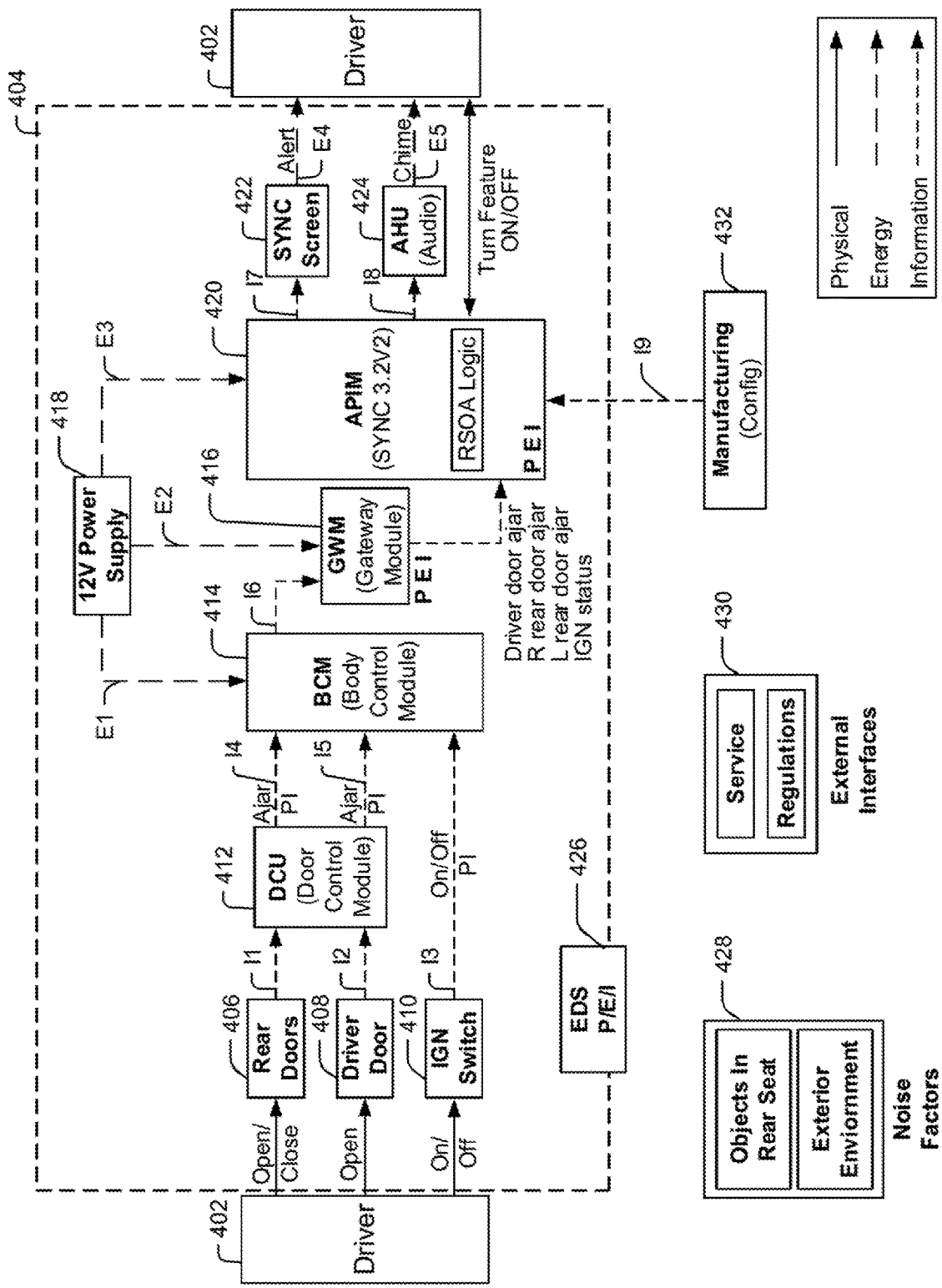
FIG. 4 illustrates a boundary diagram for an embodiment of the vehicle rear occupant alert system.

FIG. 4 illustrates a boundary diagram 400 for an aspect of the VROAS 404, according to an embodiment of the present disclosure. The boundary diagram 400 is a graphical illustration of relationships between the VROAS 404 and neighboring system and environment. The boundary diagram 400 also illustrates relationships between components within the VROAS 404 and provides a demarcation between an activity of a driver 402 and activities of the VROAS 404.

Noise factors 428 of the VROAS 404, such as external environment, objects in the rear seat whose presence might create a situation to arm the VROAS 404, are demarcated from the VROAS 404 in the boundary diagram 400. Further, external interfaces 430 such as service and regulations and a manufacturing process 432 are demarcated from the VROAS 404 in the boundary diagram. The boundary diagram 400 discloses a flow of energy and information within the VROAS 404 and physical activities that trigger the flow of the energy and the information.

The VROAS 404, in an aspect, includes modules such as a Door Control Unit (DCU) 412, a Body Control Module (BCM) 414, a Gateway Module (GWM) 416, a power supply 418, an Auxiliary Protocol Interface Module (APIM) 420, and Electrical Distribution System (EDS) 426. The DCU 412, the BCM 414, the GWM 416, the power supply 418, and the APIM 420 of the VROAS 404 are arranged in a series combination to perform logical decisions to eliminate or reduce the opportunity of false detection of the rear seat occupants in the vehicle. The BCM 414, the GWM 416, and the APIM 420 are powered by a power supply unit 418 which is a 12V power supply. The power supply unit 418 provides power E1 to the BCM 414, power E2 to the GWM 416, and power E3 to the APIM 420. The EDS 426 provides wiring to connect modules of the VROAS 404, such as the DCU 412, the BCM 414, the GWM 416, the power supply 418, the APIM 420, etc., with each other.

The driver 402 performs an activity that changes the physical status of the vehicle. The driver 404 opens one or more rear doors 406 or opens a driver door 408 and operates an ignition switch 410. In at least one aspect of the present disclosure, the ignition switch 410 may be operated using a physical/mechanical interface that includes an ignition key or a push button or a wireless interface that includes Bluetooth or infra-red signals. One or more door position sensors (not shown in the Figure) are coupled to the rear doors 406 or coupled to the driver door 408 to monitor activities of the driver 402 corresponding to the rear doors 406 and the driver door 408 of the vehicle. The one or more door position sensors provide information on information lines I1 and I2 to the DCU 412. An ignition sensor (not shown in the Figure) is coupled to the ignition switch 410 to monitor action performed on the ignition switch 410 by the driver 402 of the vehicle.

The DCU 412 determines the position of the one or more rear doors 406 and the driver door 408 based on the information on the information lines I1 and I2, respectively. The DCU 412 provides information about the determined status of the one or more rear doors 406 and the driver door 408 to the BCM 414.

The DCU 412 generates an information on an information line I4 that the status of the one or more rear doors 406, which is a rear door status, is in an open position and an information on an information line I5 that the status of the driver door 408, that is a driver door status, is in an open position. The DCU 412 provides information on the information lines I4 and I5 to the BCM 414. The ignition sensor provides information on an information line I3 to the BCM 414 indicating that the ignition state is either in an ON state or in an OFF state.

The BCM 414 is configured to manage various power control functions such as exterior lighting, interior lighting, keyless entry, remote start and is coupled to the sensors such as ignition sensor, door position sensors. Further, the BCM 414 is configured to monitor the operating mode of the vehicle. The operating modes of the vehicle are a normal mode, a transport mode, and a factory mode. In the normal mode, electrical systems such as exterior lighting, interior lighting, etc., of the vehicle are completely functional and the vehicle must be in the normal mode when the vehicle is normally used. In the transport mode, the electrical system has limited functionality for minimizing power consumption. The transport mode is used when the vehicle is not scheduled to be used for a long period, however, the vehicle is capable to be driven for a short distance. In the factory mode, the electrical system has limited functionality for minimizing power consumption and for satisfying factory regulations. The vehicle, however, can be driven for a short distance similar to the transport mode.

The BCM 414 provides information on an information line I6 to the GWM 416 to route the information in the information line I6 to the APIM 420. The BCM 414 provides information on the I6 if the one or more rear doors 406 and the driver door 408 are in the open position or the closed position. Further, the BCM 414 provides information on I6, if the ignition state is in the ON state or the OFF state. Furthermore, the BCM 414 provides information about the operating mode of the vehicle on the I6, that is, the I6 includes a signal indicating the operating mode of the vehicle. The operating mode of the vehicle is also referred as a vehicle operating mode.

The GWM 416 is programmed to receive information from a module, for example the BCM 414, through a communication channel and transmits the information to another module, for example APIM 420 through another channel. The GWM 416 routes information from the BCM 414 to the APIM 420. The information line I6 includes information about if the rear door status of the one or more rear door 406 and status of the driver door 408 are in an open position, the ignition state, and the operating mode of the vehicle.

The APIM 420 monitors and controls one or more communication devices and corresponding inputs. In an example, the communication devices are a display unit for displaying data, an audio unit including a speaker for providing audio outputs, etc. The display unit may be an input device for receiving touch-based inputs from the driver or a user and the audio unit may include a microphone for receiving voice commands.

Figure 8:
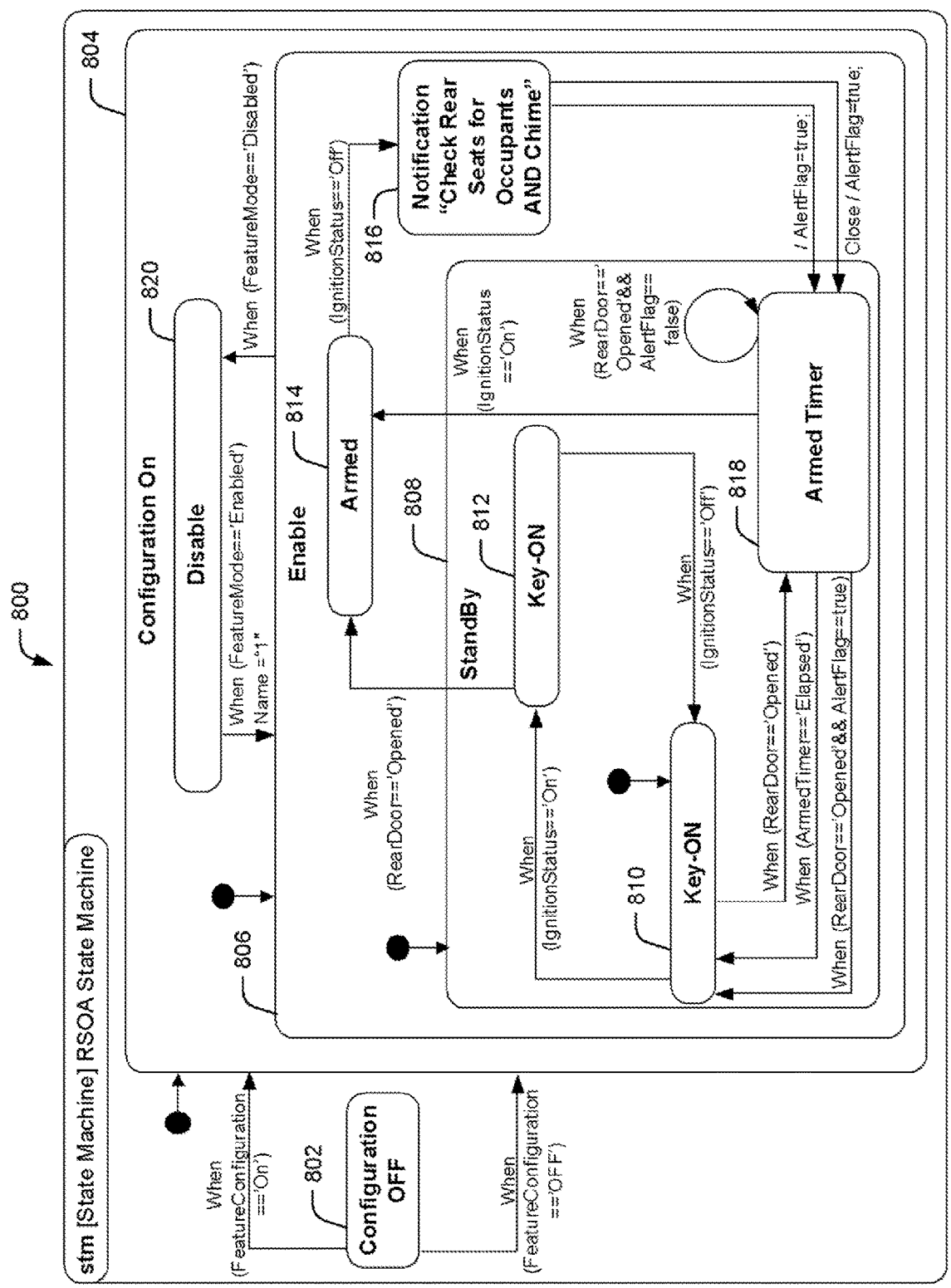
FIG. 8 is a state machine diagram of the vehicle rear occupant alert system that uses a rear seat occupant alert logic, according to one or more embodiments of the present disclosure.

The APIM 420 comprises a processor for implementing a Rear Seat Occupant Alert (RSOA) logic disclosed in the detailed description of FIG. 8. In an aspect, the processor implements the RSOA logic, if the I6 includes the information corresponding to the operating mode of the vehicle as normal mode. However, on receipt of I6 that includes information that the operating mode of the vehicle is one of the transport mode and the factory mode, then the processor does not implement the RSOA logic, irrespective of the other information, such as rear door status, driver door status, and the ignition state, on the I6. In an aspect, the normal mode is referred as a normal condition, the transport mode is referred as a transport condition and the factory mode is referred as a factory condition. The APIM 420 provides information on an information line I7 to a display unit 422, that is a Sync screen, for displaying a notification to the driver 402. Further, the APIM 420 provides information on an information line I8 to an AHU 424, that is an audio head unit, to provide audio notification, such as a chime, to notify the driver 402. The display unit 422 provides a display notification E4 and the audio unit provides an audio notification E5 to the driver 402. The driver 402 can provide inputs manually to de-activate/activate the VROAS 404. The input from the driver 402 is accepted by the APIM 420.

In an aspect, the implementation of the RSOA logic is dependent on the manufacturing process 432 of the vehicle. The APIM 420 is configured during the end of line (EOL) configuration of the vehicle to activate the VROAS 404 and provide alerts corresponding to rear seat occupancy. The VROAS 404 is configured by a signal indicating the EOL configuration. The EOL configuration is a Data IDentifier (DID) that attains values such as active and inactive. In an example, if a vehicle includes only two doors, the value of the DID is programmed as inactive as the VROAS 404 is not required during the absence of rear doors. In another example, the value of the DID is programmed as inactive if a bug is encountered during service or testing irrespective of the number of doors of the vehicle. The value of the DID as active ensures that the VROAS 404 is enabled and the value of the DID as inactive ensures that the VROAS 404 is disabled. The programming of the value of the DID to enable and disable the VROAS 404 supports a customized EOL configuring of the vehicle based on factors such as vehicle model, custom requirements, etc. The programming of the value of the DID allows customized EOL configuring of the vehicle thereby alleviating a necessity of modifying assembly line during the manufacturing process 432 of vehicles to include the VROAS 404.

The APIM 420 is configured to receive the signal corresponding to the value of the DID on the information line I9. If the received signal on the I9 includes the value of the DID as active, then the processor implements the RSOA logic by performing normal operations and providing alerts is based on the RSOA logic. However, on receipt of a signal on the I9 that the value of the DID is inactive, the processor does not implement the RSOA logic and does not generate alerts, irrespective of the other information, such as rear door status, driver door status, the ignition state, the operating mode of the vehicle on the I6.

The VROAS 404 provides rear seat occupancy alerts thereby abiding by necessities of the external interfaces 430 such as the services and regulations that govern safety requirements for vehicles and rate the vehicles based on safety features present in the vehicle. In an example, the Hot Cars Act, H.R. 3593 requires an alert system to detect the presence of an occupant and generates alerts that are distinct auditory and visual alerts for notifying the presence of an occupant. The provision of generating and providing an alert by the VROAS 404 ensures that the VROAS 404 abides by the Hot Cars Act, H.R. 3593. In another example, the European New Car Assessment Programme (Euro NCAP) is an European car safety performance assessment programme that assesses and publishes safety reports on new cars and rates the vehicles based on safety offered. The usage of the VORAS 404 in a vehicle for providing alerts to ensure that a rear occupant is not left unattended after switching the ignition OFF, allows the vehicle to conform to the safety requirements and allows the vehicle to attain a rating corresponding to improved safety by the Euro NCAP.

Figure 5:
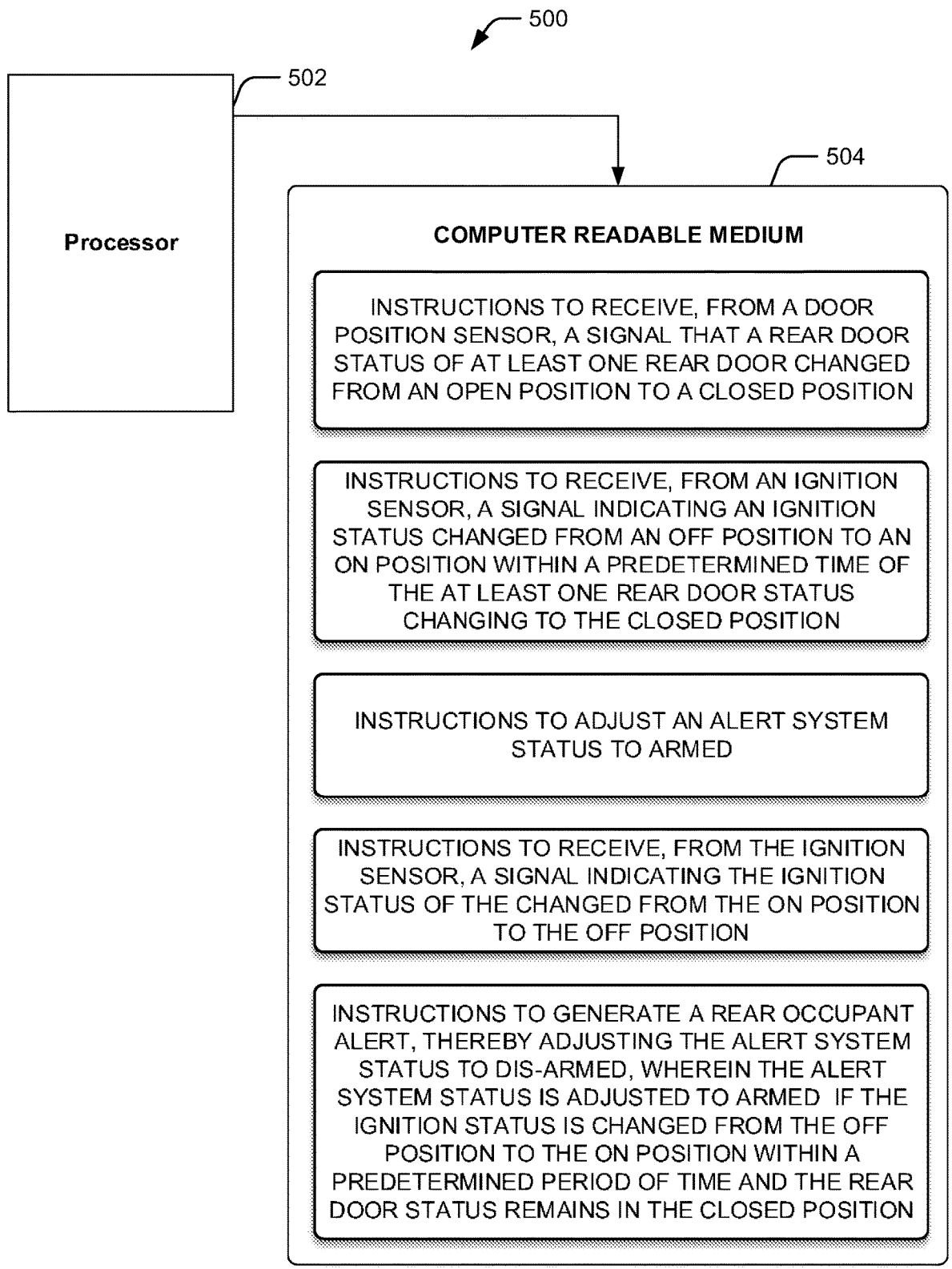
FIG. 5 is an environment including a non-transitory computer-readable medium, according to one embodiment of the present disclosure.

FIG. 5 is an environment 500 in which the system of FIGS. 1, 2 and 3 operate and various elements of these figures are referenced in explaining example the environment 500. According to one aspect of the present disclosure, the environment 500 includes a non-transitory computer-readable medium 504 and a processor 502, which is communicatively coupled to a non-transitory computer-readable medium 504. The processor 502 fetches and executes computer-readable instructions from the non-transitory computer-readable medium 504. It should be noted that the processor 502 may be same as that of the processor 202 in the system illustrated and described in FIG. 2, or the processor 310 in the system illustrated and described in FIG. 3.

According to an example, the non-transitory computer-readable medium 504 is accessible by the processor 502. Further, the non-transitory computer-readable medium 504 may include instructions to receive, from a door position sensor, a signal that the rear door status of the one or more rear doors changed from the open position to the closed position. Further, the non-transitory computer-readable medium 504 may include instructions to receive, from the ignition sensor, the signal indicating the ignition state changed from the OFF state to the ON state.

The processor determines if the ignition state changed within the predefined time of the rear door status of the one or more rear doors changing from the open to the closed position. Upon determining that the ignition state changed within the predefined time of change in the rear door status, the processor adjusts the status of the alert system to armed.

Further, the non-transitory computer-readable medium 504 may include instructions to receive, from the ignition sensor, the signal indicating the ignition state changed from the ON state to the OFF state. Finally, the non-transitory computer-readable medium 504 may include instructions to generate the rear occupant alert, thereby adjusting the status of the alert system status to disarmed. The status of the alert system is adjusted to armed if the ignition state is changed from the OFF state to the ON state within the predetermined period of time and the rear door status of the one or more rear doors remains in the closed position.

In an aspect, the non-transitory computer-readable medium 504 may include instructions, which when executed by the processor causes the processor to receive, a signal that indicates EOL binary configuration for the VROAS. The EOL binary configuration attains one of active and inactive values. The processor upon execution of the instructions receives the signal and determines that the EOL binary configuration value is active, the processor proceeds to determine statuses of the rear doors and the ignition to generate an alert accordingly. However, if the processor determines that the EOL binary configuration value is inactive, then the processor does not determine the statuses of the rear doors and the ignition and does not generate an alert corresponding to the rear seat occupancy. In an example, the EOL binary configuration value is ON that corresponds to active value and the EOL binary configuration value is OFF that corresponds to the inactive value. In another example, the active value of the EOL binary configuration is referred as active status and the inactive value of the EOL binary configuration is referred as inactive status.

In another aspect, the non-transitory computer-readable medium 504 may include instructions, which when executed by the processor causes the processor to receive, from a body control module a signal indicates an operation mode of the vehicle, such as normal mode, transport mode, or factory mode. If the processor determines that the signal indicates the operation mode of the vehicle as one of the factory mode and the transport mode, then the alert system is disarmed, and no alerts are generated irrespective of the rear door statuses and the ignition state. However, if the processor determines that the signal indicates the operation mode of vehicle as normal mode, then the alert system provides alerts based on the rear door and ignition states.

Figure 6:
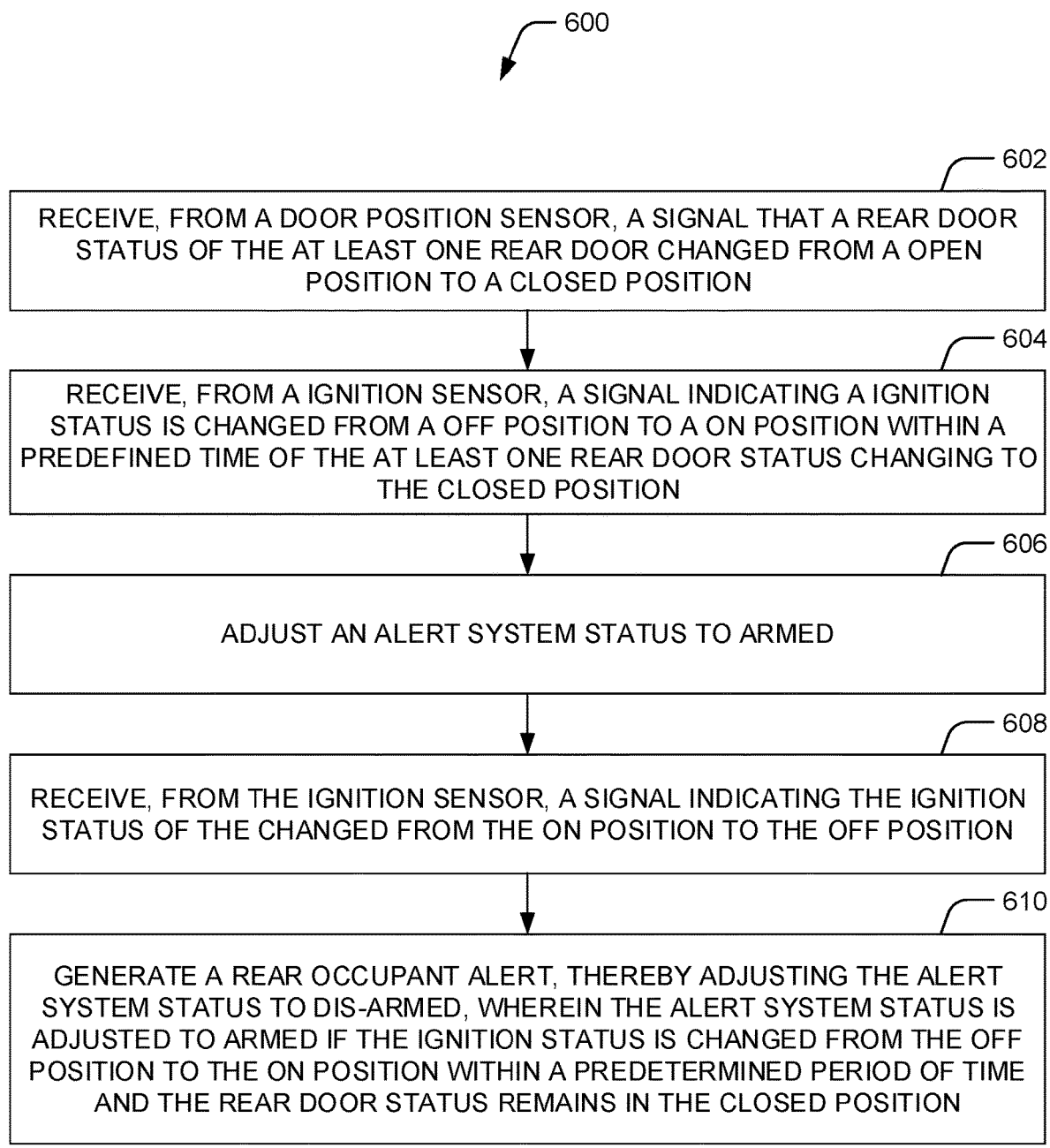
FIG. 6 is a method for detecting a rear occupant and alerting the driver to check for the rear occupant, according to one or more embodiments of the present disclosure.

FIG. 6 is a method for detecting the one or more rear seat occupants. The method 600 is provided by way of example, as there are a variety of ways to carry out the method. The method 600 described below may be carried out using the configurations illustrated in FIGS. 1-4, for example, and various elements of these figures are referenced in explaining example method 600. Each block shown in FIG. 6 represents one or more processes, methods or subroutines, carried out in the example method 600. Furthermore, the illustrated order of blocks is illustrative only and the order of the blocks may change according to the present disclosure. Additional blocks may be added or fewer blocks may be utilized, without departing from the scope of the present disclosure. The example method 600 may begin at block 602.

The method utilizes the VROAS for detecting the one or more rear seat occupant. At block 602, the processor receives the rear door status of the one or more rear doors from the corresponding door position sensors. The processor receives a signal that the rear door status changed from the open position to the closed position. The door position sensor, for example, also stores timing information of an event of toggling of the one or more rear doors from the open position to the closed position and vice versa.

At block 604, the processor receives, from the ignition sensor, the signal indicating ignition state, that is if the ignition state changed from the OFF state to the ON state within the predefined time of the rear door status changing from the open position to the closed position. At block 606, the processor adjusts the status of the alert system to armed.

At block 608, the processor receives, from the ignition sensor, the signal indicating the ignition state changed from the ON state to the OFF state. At block 610, the processor generates the rear occupant alert, thereby adjusting the status of the alert system to disarmed, Further, the status of the alert system is adjusted to armed if the ignition state is changed from the OFF state to the ON state within the predetermined period of time and the rear door status remains in the closed position.

The seat sensor provides a signal indicating the presence of the rear seat occupant. The seat sensor is operable to determine the presence of the rear seat occupant by a predetermined mass engaged with the rear seat. The processor, by considering the reception of the signals from the door position sensor, the ignition sensor, and the seat sensor, sets the status of the alert system as one of armed and disarmed.

The VROAS is operably transitionable to the de-activated status and is automatically re-activated, in an aspect after the prefixed time. The alert system, being a part of the VROAS, is also de-activated and re-activated along with the VROAS. In an example, the prefixed time is six months. In another aspect, the VROAS is automatically re-activated after the prefixed driven mileage. In at least one example the prefixed driven mileage is 15,000 miles. In an aspect of the present disclosure, the VROAS further comprises the seat sensor.

Figure 7:
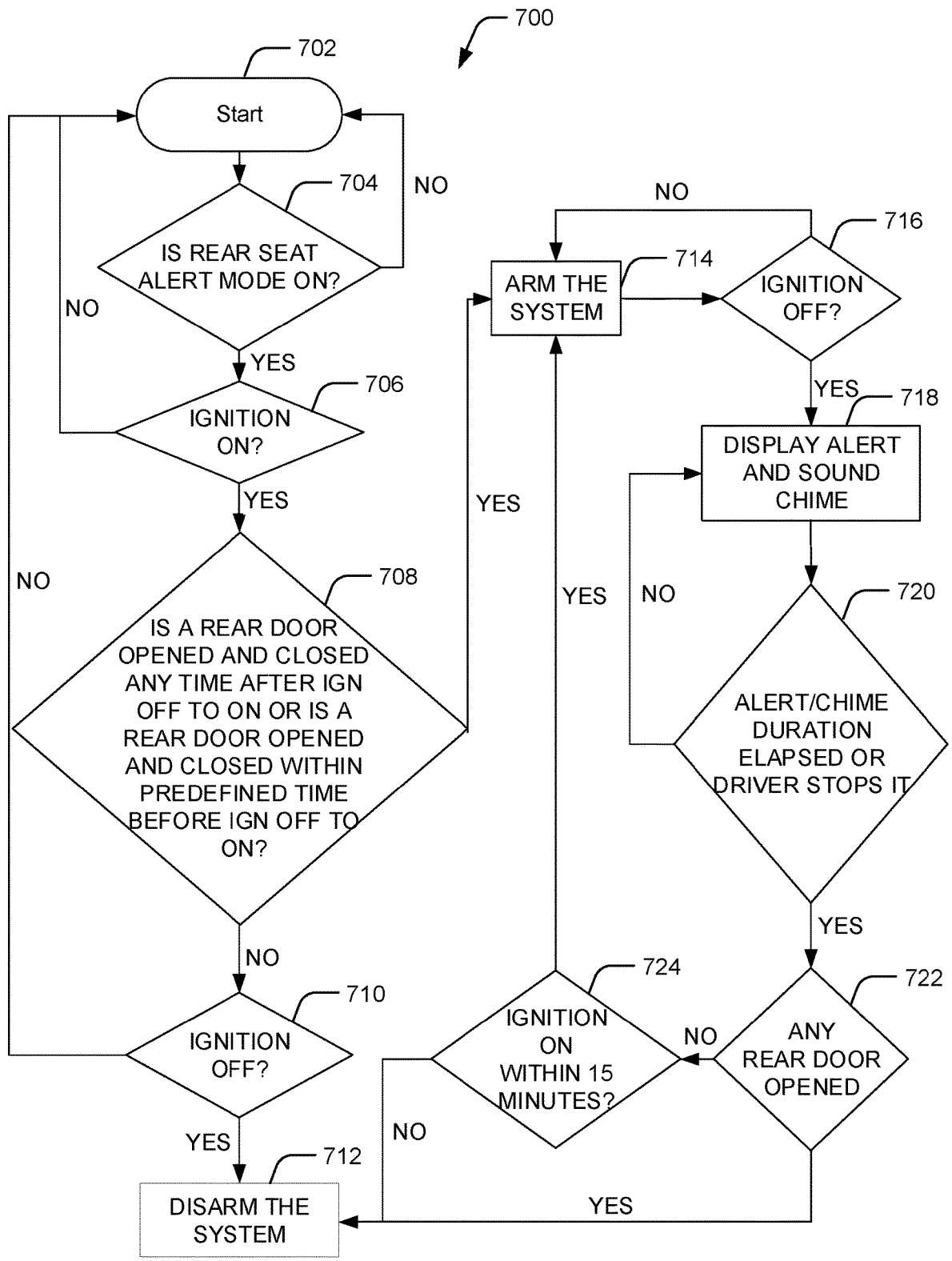
FIG. 7 is a flow diagram representing the method for detecting a rear occupant, according to one or more embodiments of the present disclosure.

FIG. 7 is a flow diagram representing the method for detecting the rear seat occupant. FIG. 7 described below, like FIG. 6, may be carried out using the configurations illustrated in FIGS. 1, 2, 3 and 4. The flow starts at block 702, where the VROAS is de-activated.

At block 704, the processor checks if the rear seat alert mode is on. If the rear seat alert mode is not ON, then the VROAS continues to be de-activated. If the rear seat alert mode is ON, then the VROAS is activated and the processor proceeds further to check the ignition state. When the rear seat alert mode is ON, then the VROAS provides rear seat occupant alerts and when the rear seat alert mode is OFF, then the VROAS does not provide the rear seat occupant alerts.

At block 706, the processor checks if the ignition state is in the ON state or OFF state. If the ignition state is in the OFF state, then the VROAS continues to be de-activated. The processor is coupled with the ignition sensors to receive the signal regarding ignition state being in the ON state or the OFF state. If the ignition state is in the ON state, then the processor proceeds to block 708.

At the block 708, the processor checks the rear door status of the one or more rear doors. The processor checks if the rear door status changed from the open position to the closed position within the predefined time, for example fifteen minutes, before the ignition state changed from the OFF state to the ON state. The processor also checks if the rear door status changed from the open position to the closed position any time after the ignition state changed from the OFF state to the ON state. If the rear door status changed from the open position to the closed position within the predefined time from an instant when the ignition state changed from the OFF state to the ON state, then the processor proceeds to the block 714 else proceeds to block 710. If the rear door status changed from the open position to the closed position any time after the ignition state changed from the OFF state to the ON state, then the processor proceeds to the block 714 else proceeds to block 710.

At the block 714, the processor transitions the state of the alert system to armed. For example, a driver picks rear occupant on the way without switching the ignition OFF. The rear occupant opens the rear door and sit inside the vehicle when the ignition continues to be ON, the VROAS then changes the status of the alert system as armed. At block 710, the processor checks the ignition state; if the ignition state is in the OFF state, then the processor proceeds to the block 712 else proceeds to the block 702 and the VROAS is de-activated. At block 712, upon determining that the ignition state is in the OFF state, the processor disarms the alert system.

After arming the alert system at the block 714, the processor proceeds to block 716. At the block 716, the processor continuously checks if the ignition state is in the OFF position. If the ignition state is in the OFF position, the processor proceeds to block 718.

At the block 718, upon determining that the signition state is in the OFF position, the processor displays an alert or sounds a chime for a predetermined duration to indicate the driver to check the rear seat.

The processor proceeds to the block 720 and checks if the predetermined duration has elapsed or if the processor has received an input from the driver to stop the alert. If the predetermined duration for displaying the alert or sounding the chimes has elapsed or if the processor has received the input to stop the alert, then the processor proceeds to block 722.

At the block 722, the processor checks if the rear door has opened. If the processor receives a signal that the rear door is opened, then the processor proceeds to the block 712 and disarms the system. If the processor does not receive the signal indicating that the rear door was opened, then the processor proceeds to block 724.

At the block 724, the processor checks if the ignition state is in the ON state within a predetermined period of time, for example, fifteen minutes. If the ignition is on within the predetermined period of time, then the processor proceeds to the block 714 and arms the alert system. If the ignition state is not in the ON state within the predetermined period of time, then the processor proceeds to the block 712 and disarms the alert system.

FIG. 8 is a state machine diagram 800 of the VROAS that uses a Rear Seat Occupant Alert (RSOA) logic. A state machine diagram demonstrates a dynamic behavior of components over time by modeling the lifecycle of the components. Key elements described in the state machine are states, transitions, events, and actions. The VROAS corresponds to a feature that alerts the driver to check for the rear seat occupants.

FIG. 8 described below may be carried out using configurations illustrated in FIGS. 1, 2, 3 and 4. Based on the RSOA logic, the VROAS comprises two statuses that are a configuration OFF status 802 and a configuration ON status 804. The configuration OFF status 802 of the VROAS is due to inactive power supply to the VROAS. The configuration ON status 804 is when the VROAS has an active power supply. The VROAS is in the configuration OFF status 802 when feature configuration is OFF, that is inactive power supply. The VROAS is in the configuration ON status 804 when the feature configuration is ON, that is the VROAS has active power supply.

The VROAS provides a feature of alerting the driver to check for the rear seat occupants. A feature configuration signal indicates the status of the configuration of the VROAS. The VROAS in the configuration OFF status 802 signifies a complete shutdown of the VROAS. During the configuration OFF status 802 the VROAS is unable to provide the feature of alerting the driver to check for the rear seat occupants and does not provide a notification after a prefixed time to the driver to enable the VROAS. In an aspect, the feature configuration corresponds to the EOL binary configuration, as described in the detailed description of FIG. 5, wherein the configuration ON status corresponds to the active value and the configuration OFF status corresponds to the inactive value. In another aspect, the feature configuration corresponds to the operation mode of the vehicle, as described in the detailed description of FIG. 4 and FIG. 5, wherein the configuration ON status corresponds to the normal mode and the configuration OFF status corresponds to one of the transport mode and the factory mode.

The configuration ON status 804 includes two modes of working of components of the VROAS. The modes and states of the VROAS are achieved when a processor corresponding to the VROAS executes instructions present in a non-transitory medium, such as a memory, corresponding to the VROAS. A feature mode signal indicates the modes of the VROAS.

The first mode is an enable mode 806 where the feature mode signal indicates that the VROAS is enabled. During the enable mode, the components of the VROAS, that are an ignition sensor, the door position sensor, and the alert system are active. The alert system includes a processor and a memory. The components of the VROAS are working towards determining the presence of the rear seat occupant and alerting the driver to check for the rear seat occupant. The memory includes instructions that are executed by the processor to implement the RSOA logic. The flow of execution of the instructions by the processor and the inputs from the ignition sensor and the door position sensor determine the states of the VROAS Another mode of the VROAS is a disable mode 820 where the features of the VROAS to determine the presence of the rear seat occupant and alert the driver to check for the rear seat occupant are disabled. The feature mode signal indicates that the VROAS is disabled. In an example, the VROAS is manually enabled and disabled, where enabling the VROAS is synonymous to activating the VROAS and disabling the VROAS is synonymous to de-activating the VROAS.

During the enable mode 806, the VROAS provides the feature of alerting the driver to check for the rear seat occupant actively for every ignition cycle. The enable mode 806 includes a sub-mode that is standby mode 808, wherein the alert system of the VROAS accepts signals from the ignition sensor and waits for a time to elapse. The enable mode 806 begins with a key OFF state 810, that is state 1. The VROAS is in the key OFF state 810 when ignition status is in the OFF state. The processor executes an instruction to receive the signal that provides information about the ignition status. The status of the ignition is monitored by the ignition sensor and the ignition sensor provides information that the ignition status is in the OFF state.

The VROAS proceeds to a key ON state 812, that is state 2 when the ignition status is on. The processor executes the instruction to receive the signal that provides information about the ignition status. When the signal provides the information to the processor that the ignition status is the ON state, the status triggers the VROAS to transition from the key OFF state 810 to the key ON state 812.

The VROAS proceeds to an armed state 814, that is state 3, when at least one rear door changes position from closed to open. The door position sensor monitors the position of the rear doors and provides information that the position of the rear door is open. The processor executes the instruction to receive the signal that provides information about the rear door position status.

The processor receives the signal that provides the information about the status of the rear door, that is the rear door status, which is in the open position. Upon receiving the signal indicative of the rear door status, the processor triggers the VROAS to transition from the key ON state 812 to the armed state 814. However, if the signal provides the information to the processor that the rear door is in the closed position and the processor receives a signal that provides information about that the ignition state is in the OFF state, then the VROAS transition from the key ON state 812 to the key OFF state 810. In an aspect, the door position sensor is positioned at the driver door along with the one or more rear doors. The VROAS proceeds to the armed state 814, when at least one rear door and the driver door changes position from closed to open.

The VROAS proceeds to notification state 816, that is state 4, from the armed state 814 when the ignition state transitions from the ON state to the OFF state. The processor receives a signal that the ignition state is in the OFF state. When the signal provides the information to the processor that the ignition state is in the OFF state, the status triggers the VROAS to transition from the armed state 814 to the notification state 816. During the notification state 816, the VROAS provides a notification, for example, a visual notification "check rear seats for occupants" and an audio notification such as a chime. During the notification state 816, the VROAS sets an alert flag as true, indicating that the VROAS is providing the alert. Upon setting the alert flag as true or if the processor receives information about the rear door being in a closed position, then the VROAS transitions from the notification state 816 to an armed timer state 818, that is state 5.

During the armed timer state 818, the VROAS continues to stay in the same state for the predetermined period of time, for example, fifteen minutes. The VROAS continues to stay in the armed timer state 818 till the processor receives the status of the rear door, that is rear door status, as the open position and the alert flag is set as false. The setting of the alert flag as false indicates that the VROAS is not providing an alert at that current moment during the armed timer state 818.

The VROAS proceeds to transition from the armed timer state 818 to the key OFF state 810 when the alert flag is set as true and when the processor receives a signal from the door position sensor that the rear door status is the open position.

Further, the VROAS may also proceed to transition from the armed timer state 818 to the key OFF state 810 when the predetermined period of time has elapsed, that is armed timer has elapsed. However, if the processor receives the signal from the ignition sensor that the ignition state is in the ON state during the armed timer state 818 and before the armed timer has elapsed, then the VROAS transitions from the armed timer state 818 to the armed state 814.

During the key OFF state 810, the processor receives the signal that provides information that the rear door is in the open position, then the VROAS transitions from the key OFF state 810 to the armed timer state 818 and waits for the predefined time to transition to the armed state 814. In an aspect, the predefined time is fifteen minutes. The VROAS is operably transitionable to disable mode 820. The VROAS can be manually transitioned to the disable mode 820 by the driver. The VROAS, in an aspect, provides a notification after the prefixed time or prefixed driven mileage to the driver to enable the VROAS. In a specific aspect, the VROAS provides the notification to the driver semi-annually, that is, 6 months. In another specific aspect, the VROAS provides notification to the driver after 15,000 miles of driving to enable the VROAS.

Although the present disclosure has been described with reference to specific embodiments, this description is not meant to be construed in a limiting sense. Various modifications of the disclosed embodiments, as well as alternate embodiments of the present disclosure, will become apparent to persons skilled in the art upon reference to the description of the present disclosure. It is therefore contemplated that such modifications can be made without departing from the spirit or scope of the present disclosure as defined

We claim:

1. A vehicle rear occupant alert system, comprising:
a door position sensor operably coupled with at least one rear door of a vehicle, wherein the door position sensor is operable to determine a rear door status between an ajar position and a closed position;
an ignition sensor operably coupled with the vehicle, wherein the ignition sensor is operable to determine an ignition state between an on state and an off state;
an alert system operably coupled with the door position sensor and the ignition sensor, the alert system transitionable between an activated status and a de-activated status, the alert system comprising one or more processors, and a non-transitory computer-readable medium comprising executable instructions, which when executed by a processor, causes the processor to:
determine a status of the alert system, wherein when the status of the alert system is activated:
receive, from the door position sensor, a signal that the rear door status of at least one rear door changed from the ajar position to the closed position;
receive, from the ignition sensor, a signal indicating the ignition state is changed from the off state to the on state within a predefined time of the at least one rear door status changing to the closed position;
adjust an alert system status to armed;
receive, from the ignition sensor, a signal indicating the ignition state of the vehicle is changed from the on state to the off state; and
generate a rear occupant alert, thereby adjusting the alert system status to disarmed, wherein the alert system status is adjusted to armed, if the ignition state is changed from the off state to the on state within a predetermined period of time and the rear door status remains in the closed position,
wherein the alert system is operably transitionable to a de-activated status by a user input and the alert system remains in a de-activated status for a predetermined period,
wherein after the predetermined period, the alert system is operable to notify the user of the status of the alert system.

2. The system of claim 1, wherein the alert system is automatically transitioned from a de-activated status to an activated status after the predetermined period, and the predetermined period is a prefixed time and/or a prefixed driven mileage.

3. The system of claim 2, wherein the prefixed time is 6 months, or the prefixed mileage is 15,000 miles.

4. The system of claim 1, further comprising a seat sensor coupled with a rear seat, the seat sensor operable to determine a presence of a rear seat occupant by a predetermined mass engaged with the rear seat, and the non-transitory computer-readable medium comprising executable instructions, which when executed by a processor, further causes the processor to: receive, from the seat sensor, a signal indicating the presence of a rear seat occupant.

5. The system of claim 1, wherein the alert is an auditory alert.

6. The system of claim 1, wherein the alert system further comprises a display, and processor is operable to display the alert on the display.

7. The system of claim 6, wherein the alert is an auditory alert and a visual alert.

8. A non-transitory computer-readable medium comprising executable instructions, which when executed by a processor, causes the processor to:
determine a status of an alert system, the alert system transitionable between an activated status and a de-activated status, wherein when the status of the alert is system is the activated status:
receive, from a door position sensor, a signal that a rear door status of at least one rear door changed from an ajar position to a closed position;
receive, from an ignition sensor, a signal indicating an ignition state changed from an off state to an on state within a predefined time of the at least one rear door status changing to the closed position;
adjust the alert system status to armed;
receive, from the ignition sensor, a signal indicating the ignition state of the vehicle is changed from the on state to the off state; and
generate a rear occupant alert, thereby adjusting the alert system status to disarmed, wherein the alert system status is adjusted to armed if the ignition state is changed from the off state to the on state within a predetermined period of time and the rear door status remains in the closed position,
wherein the alert system is operably transitionable to a de-activated status by a user input and the alert system remains in a de-activated status for a predetermined period,
wherein after the predetermined period, the alert system is operable to notify the user of the status of the alert system.

9. The non-transitory computer-readable medium of claim 8, wherein the alert system is automatically transitioned from a de-activated status to an activated status after the predetermined period, and the predetermined period is a prefixed time and/or prefixed driven mileage.

10. The non-transitory computer-readable medium of claim 9, wherein the alert system status is automatically re-activated after the prefixed time of 6 months or after 15,000 mileage.

11. The non-transitory computer-readable medium of claim 8, further comprising receive, from a seat sensor, a signal indicating the presence of a rear seat occupant, the seat sensor operable to determine a presence of a rear seat occupant by a predetermined mass engaged with the rear seat.

12. The non-transitory computer-readable medium of claim 8, wherein the alert is an auditory alert.

13. The non-transitory computer-readable medium of claim 8, further comprising displaying, on a display, the alert.

14. A method of detecting a rear occupant, comprising:
determining a status of an alert system, the alert system transitionable between an activated status and a de-activated status, wherein when the status of the alert is system is the activated status:
receiving, from a door position sensor, a signal that a rear door status of at least one rear door changed from an open position to a closed position;

receiving, from an ignition sensor, a signal indicating an ignition state changed from an off state to an on state within a predefined time of the at least one rear door status changing to the closed position;

adjusting the alert system status to armed;

receiving, from the ignition sensor, a signal indicating the ignition state of the vehicle is changed from the on state to the off state; and generating a rear occupant alert, thereby adjusting the alert system status to disarmed, wherein the alert system status is adjusted to armed if the ignition state is changed from the off state to the on state within a predetermined period of time and the rear door status remains in the closed position, wherein the alert system is operably transitionable to a de-activated status by a user input and the alert system remains in a de-activated status for a predetermined period, wherein after the predetermined period, the alert system is operable to notify the user of the status of the alert system.

15. The system of claim 14, wherein the alert system is automatically transitioned from a de-activated status to an activated status after the predetermined period, and the predetermined period is a prefixed time and/or prefixed driven mileage.

16. The method of claim 14, receiving, from a seat sensor, a signal indicating the presence of a rear seat occupant, the seat sensor operable to determine a presence of a rear seat occupant by a predetermined mass engaged with the rear seat.

17. The method of claim 14, further comprising displaying, on a display, the alert.

18. The system of claim 1, wherein after the predetermined period, the alert system prompts the user change the status of the alert system.

19. The non-transitory computer-readable medium of claim 8, wherein after the predetermined period, the alert system prompts the user to change the status of the alert system.

20. The method of claim of claim 14, further comprising prompting the user, after the predetermined period, to change the status of the alert system.

* * * * *